US007653798B2

United States Patent
Kim et al.

(10) Patent No.: US 7,653,798 B2
(45) Date of Patent: Jan. 26, 2010

(54) APPARATUS AND METHOD FOR CONTROLLING MEMORY ALLOCATION FOR VARIABLE SIZE PACKETS

(75) Inventors: Bong Wan Kim, Seoul (KR); Dong Yong Kwak, Daejeon (KR)

(73) Assignee: Electronics and Telelcommunications Research Institute, Daejeon (KR)

( * ) Notice: Subject to any disclaimer, the term of this patent is extended or adjusted under 35 U.S.C. 154(b) by 345 days.

(21) Appl. No.: 10/713,943

(22) Filed: Nov. 14, 2003

(65) Prior Publication Data

US 2004/0128463 A1 Jul. 1, 2004

(30) Foreign Application Priority Data

Dec. 18, 2002 (KR) ............... 10-2002-0081383

(51) Int. Cl.
 G06F 12/02 (2006.01)
(52) U.S. Cl. .................... 711/171; 711/202
(58) Field of Classification Search .......... 711/171
 See application file for complete search history.

(56) References Cited

U.S. PATENT DOCUMENTS

| 5,479,656 | A | * | 12/1995 | Rawlings, III | ............. | 707/200 |
| 5,623,654 | A | * | 4/1997 | Peterman | .................... | 707/206 |
| 5,784,669 | A | * | 7/1998 | Miura et al. | ................. | 399/58 |
| 5,784,698 | A | | 7/1998 | Brady et al. | | |
| 5,784,699 | A | * | 7/1998 | McMahon et al. | ......... | 711/171 |
| 5,802,598 | A | | 9/1998 | Watt | | |
| 6,078,989 | A | * | 6/2000 | Kato et al. | .................. | 711/114 |
| 6,088,777 | A | | 7/2000 | Sorber | | |
| 6,295,594 | B1 | * | 9/2001 | Meier | ......................... | 711/171 |
| 6,427,195 | B1 | * | 7/2002 | McGowen et al. | .......... | 711/153 |
| 6,430,665 | B1 | * | 8/2002 | Allison et al. | ............... | 711/172 |
| 6,453,404 | B1 | * | 9/2002 | Bereznyi et al. | ............ | 711/171 |
| 6,539,464 | B1 | * | 3/2003 | Getov | ......................... | 711/170 |

(Continued)

FOREIGN PATENT DOCUMENTS

| JP | 08-153037 | 6/1996 |
| JP | 2002-185505 | 6/2002 |

OTHER PUBLICATIONS

Hardware Support for Fast and Bounded-Time Storege Allocation, by Donahue et al. (published Mar. 22, 2002). pp. 10.*

(Continued)

*Primary Examiner*—Matt Kim
*Assistant Examiner*—Kaushikkumar Patel
(74) *Attorney, Agent, or Firm*—Blakely Sokoloff Taylor & Zafman

(57) ABSTRACT

A memory management apparatus and method for storing data in units of various packet sizes in appliances utilizing memory devices are provided. The memory allocation apparatus includes data memory which includes a plurality of data blocks, each of which includes a plurality of sub data blocks having a predetermined size, and when there is a request for allocating memory space of a variable size, allocates memory space in units of any one of the sub data blocks and the data blocks, a free list memory which manages an free memory space of the data memory as at least one or more lists, and registers that store head location information and tail location information of the list.

18 Claims, 4 Drawing Sheets

U.S. PATENT DOCUMENTS

| | | | |
|---|---|---|---|
| 6,549,982 B1 * | 4/2003 | Yamanaka | 711/118 |
| 6,760,795 B2 * | 7/2004 | Goudie et al. | 710/56 |
| 6,877,065 B2 * | 4/2005 | Galbraith et al. | 711/113 |
| 6,888,848 B2 * | 5/2005 | Beshai et al. | 370/474 |
| 6,892,284 B2 * | 5/2005 | Ling et al. | 711/153 |
| 6,910,099 B1 * | 6/2005 | Wang et al. | 711/113 |
| 2002/0131084 A1 * | 9/2002 | Andrew et al. | 358/1.16 |
| 2002/0133648 A1 * | 9/2002 | Goudie et al. | 710/56 |
| 2002/0144073 A1 * | 10/2002 | Trainin et al. | 711/170 |
| 2002/0150381 A1 * | 10/2002 | Ando et al. | 386/46 |
| 2003/0018689 A1 * | 1/2003 | Ramakrishnan | 709/104 |
| 2003/0084266 A1 * | 5/2003 | Knippel et al. | 711/173 |
| 2003/0121030 A1 * | 6/2003 | Koob et al. | 717/152 |

OTHER PUBLICATIONS

Linked List Basics by Nick Partante. 2001. pp. 26.*

Datastructure and Algorithms, Lists by John Morris 1998. pp. 3. (http://www.oopweb.com/algorithms/documents/PLDS210/volume/lists.html).*

Principles of Computer Architecture by, Miles J. Murdicca (pub. 2000). p. 270.*

Storage Allocation Mechanism for Different Length Data Elements, by Albert et al. published by IBM Technical Bulletin on Apr. 1, 1975 TBD 04-75, pp. 1-7.*

* cited by examiner

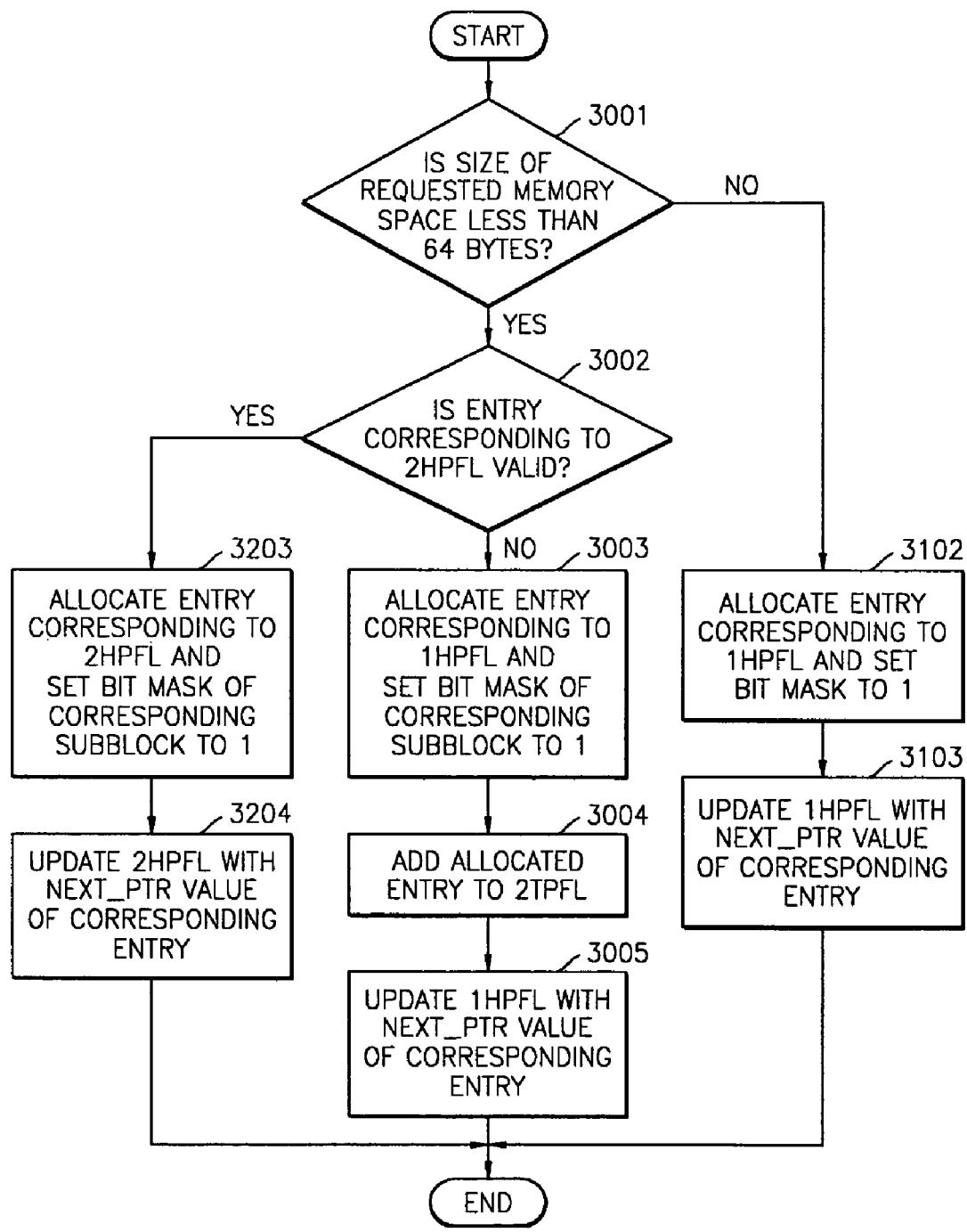

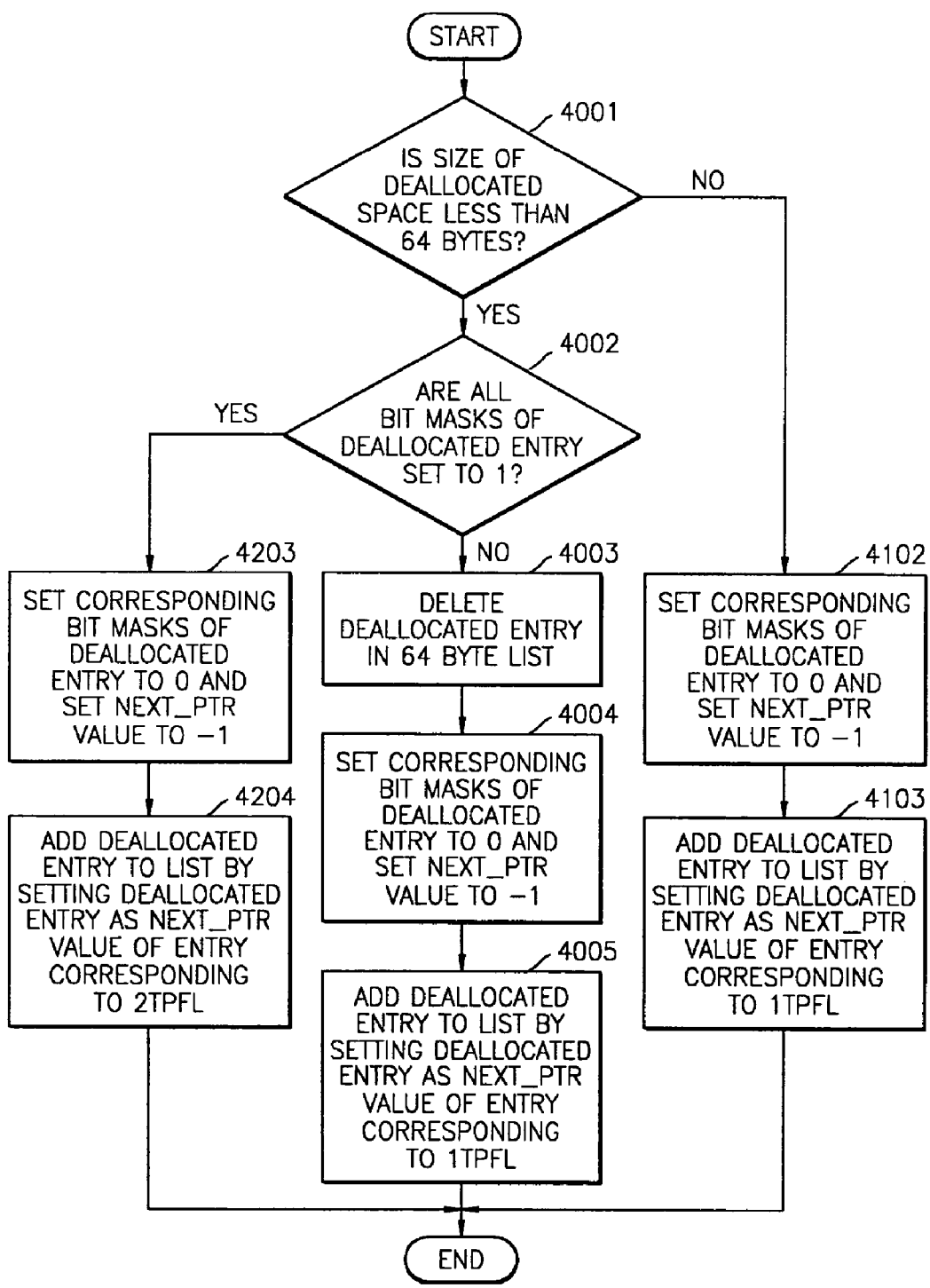

APPARATUS AND METHOD FOR CONTROLLING MEMORY ALLOCATION FOR VARIABLE SIZE PACKETS

This application claims priority from Korean Patent Application No. 2002-81383, filed Dec. 18, 2002, the disclosure of which is incorporated herein by reference in their entirety.

BACKGROUND OF THE INVENTION

1. Field of the Invention

The present invention relates to a method of effectively using an electric memory device (hereinafter referred to as a 'memory'), and more particularly, to a memory management apparatus and method for storing data in units of variable size packets in appliances utilizing memory devices.

2. Description of the Related Art

Generally, when new memory space is needed in a computer or a communication device, the location of the memory space is determined in part of the memory device by a process referred to as allocation, and the location is managed by another memory space which keeps an address value referred to as a pointer. For this memory management, most computers and communications devices employ a method by which a memory device is divided into fixed-size units and managed. However, since uniform memory allocation is performed even for small-sized packets among variable sized packets in this method, the method has a drawback in that much space in the memory is wasted.

To solve this problem, a method is suggested in U.S. Pat. No. 6,088,777 granted to Sober on 11 Jul. 2000, entitled "Memory system and method for dynamically allocating a memory divided into plural classes with different block sizes to store variable length messages" and other patents, disclosing a method by which a memory device is not divided into fixed-size units beforehand but allocated a memory space appropriate to the request whenever there is a request for allocating a memory space.

However, although this method has an advantage in that wasting memory space can be minimized, its hardware implementation is complicated. In addition, since memory space rearrangement (referred to as garbage collection) should be performed periodically, this method can be applied only by software.

SUMMARY OF THE INVENTION

The present invention provides a memory allocation apparatus and method by which when there is a request for allocating memory space of a variable size, wasted memory space can be minimized by dividing a memory device into a plurality of fixed-size units and managing the memory units so that the management of location address values for memory allocation can be implemented by hardware.

The present invention also provides a computer readable medium having embodied thereon a computer program for executing the memory allocation method in a computer.

According to an aspect of the present invention, there is provided a memory management apparatus comprising: data memory, which comprises a plurality of data blocks, each of which comprises a plurality of sub data blocks having a predetermined size, and when there is a request for allocating memory space of a variable size, allocates memory space in units of any one of the sub data blocks and the data blocks; free list memory, which manages an free memory space of the data memory as at least one or more lists; and registers that store head location information and tail location information of the list.

According to another aspect of the present invention, there is provided a memory allocation method comprising: (a) when n is a power of 2 and i is a positive integer, if the size of a requested memory space for allocation is greater than $$\frac{n}{2^i}$$

bytes, allocating an $$\frac{n}{2^{i-1}}$$

byte memory space to a valid entry existing in an $$\frac{n}{2^{i-1}}$$

byte entry list managed by a free list memory; and (b) if the size of a requested memory space for allocation is equal to or less than $$\frac{n}{2^i},$$

allocating an $$\frac{n}{2^i}$$

byte memory space to a valid entry existing in an $$\frac{n}{2^i}$$

byte entry list managed by the free list memory, but if there is no valid entry in the $$\frac{n}{2^i}$$

byte entry list, dividing the $$\frac{n}{2^{i-1}}$$

byte entry list and allocating the divided $$\frac{n}{2^{i-1}}$$

byte entry list as an $$\frac{n}{2^i}$$

byte memory space.

According to an aspect of the present invention, there is provided a memory deallocation method comprising: (a) when n is a power of 2 and i is a positive integer, if the size of a deallocated memory space is greater than $$\frac{n}{2^i}$$

bytes, deallocating an $$\frac{n}{2^{i-1}}$$

byte memory space to a data memory and including an entry corresponding to the memory space in an $$\frac{n}{2^{i-1}}$$

byte entry list managed by a free list memory; and (b) if the size of a deallocated memory space is equal to or less than $$\frac{n}{2^i}$$

bytes, deallocating a memory space of $$\frac{n}{2^i}$$

bytes to the data memory and including an entry corresponding to the memory space in an $$\frac{n}{2^i}$$

byte entry list managed by the free list memory, but if a neighboring memory space managed by the entry which manages the deallocated memory space is not in use, including an entry, which corresponds to a memory space obtained by combining the deallocated memory space and the neighboring memory space, in the $$\frac{n}{2^{i-1}}$$

byte entry list.

BRIEF DESCRIPTION OF THE DRAWINGS

The above objects and advantages of the present invention will become more apparent by describing in detail exemplary embodiments thereof with reference to the attached drawings in which:

FIG. 3 is a flowchart of the steps performed by a memory space allocation method for the memory device shown in FIG. 2; and FIG. 4 is a flowchart of the steps performed by a memory space deallocating method for the memory device shown in FIG. 2.

DESCRIPTION OF THE PREFERRED EMBODIMENTS

The present invention comprises an apparatus and method for allocating memory space appropriate to memory space allocation requests that are frequently occurring in application programs and communications devices in order to allocate memory space of a variable size in a predetermined region. More specifically, when data is divided into fixed-size units and stored, one data is formed with segments that are each comprised of a header part containing index information and a payload part containing the actually divided fixed-size units. In this case, each segment has a size in a predetermined range. When a request for storing this segment in a memory device is made, the request is made for allocating a memory space less than a maximum size that has been determined beforehand. For managing addresses for memory space allocation, in the prior art, memory is divided into units of a uniform fixed size, or memory allocation is performed by a complicated software-based method. However, in the memory management apparatus and method according to the present invention, memory is divided into units of a plurality of fixed sizes and managed so that the addresses for the allocated memory locations can be managed by hardware. Then, when memory space for storing a variable size packet is allocated, a block or subblock, which is the most suitable for the request for allocation of memory space, is allocated. Accordingly, the apparatus and method are appropriate for high-speed memory space allocation and enable efficient use of the memory space such that wastting memory can be minimized.

Figure 1:
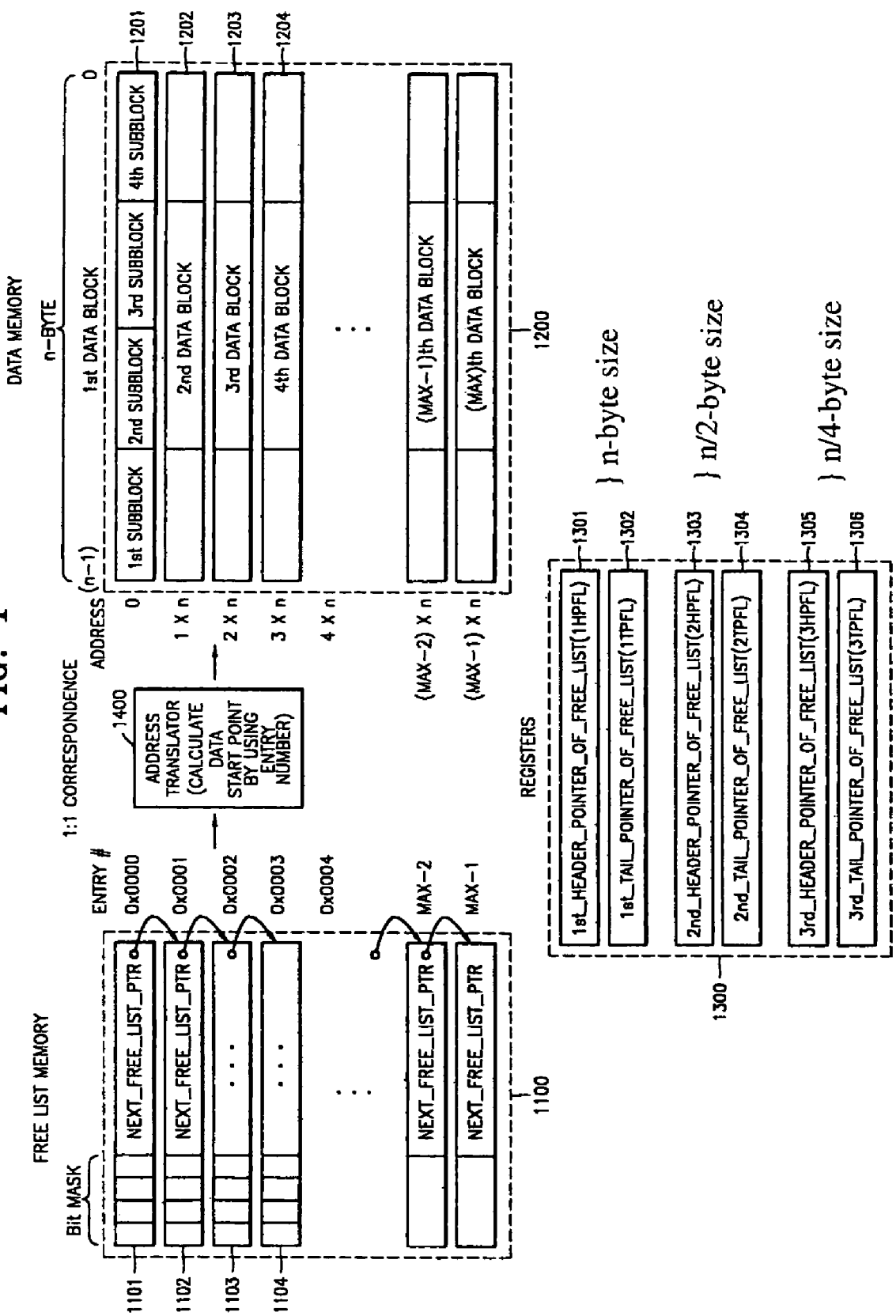
FIG. 1 is a block diagram showing an example of memory space allocation of a memory device according to a preferred embodiment of the present invention in which one data memory block comprises 4 subblocks.

FIG. 1 is a block diagram showing an example of memory space allocation of a memory device according to a preferred embodiment of the present invention in which one data memory block comprises 4 subblocks. Referring to FIG. 1, the memory apparatus according to the present invention comprises a free list memory 1100, a data memory 1200, a plurality of registers 1300, and an address translator 1400.

The data memory 1200 is a memory area, in which actual data is to be stored, and comprises a plurality of blocks, each of which comprises a plurality of subblocks having a predetermined length. When a variable size memory space is requested, memory space is allocated in units of the subblocks or in units of the blocks in the data memory 1200. The free list memory 1100 is a memory for managing the data memory 1200 and manages free memory spaces (that is, the memory spaces not in use) with at least one or more lists through the use of pointers. The register 1300 stores the header pointer and tail pointer of a list. The address translator 1400 converts addresses between the data memory 1200 and the free list memory 1100. The memories 1100 and 1200 and the registers 1300 can be implemented in one memory with respective addresses or in their respective memories.

The number of entries of the free list memory 1100 is the same as the number of entries of the data memory 1200. As well, the memories 1100 and 1200 have a 1:1 corresponding relationship. Accordingly, information dealt with in entry number 1 of the free list memory 1100 indicates that this information corresponds to entry number 1 of the data memory 1200. Therefore, a pointer for the corresponding relationship between these two memories is not needed and memory space can be saved.

The address corresponding relationship between the free list memory 1100 and the data memory 1200 will now be explained. For example, if the start address of the data memory 1200 is 0, the start address of each entry forming the data memory 1200 is calculated by a simple rule such as "entry number x block size (n)". The size of a block of the data memory 1200 can be any number but is usually a number obtained by raising 2 to the power of a positive integer. Accordingly, the address translator 1400 performs address calculation between the data memory 1200 and the free list memory 1100, by only adding some 0's to an entry number expressed in a binary digit. Particularly, when the process of calculating address between these two memories is implemented by hardware, only simply connecting a signal line corresponding to each entry number to an upper bit line is needed but an address translator is not needed for the implementation. If the start address of the data memory 1200 is not 0, only adding the start address of the data memory 1200 is needed in the address translator 1400. That is, in this case, the start address of each entry forming the data memory 1200 is "entry number x block size (n)+start address of data memory."

The free list memory 1100 comprises entries 1101, 1102, ..., with bit masks and pointer values. Each bit mask corresponds to a subblock included in a block of the data memory 1200 and indicates whether or not the corresponding subblock is now in use.

FIG. 1 shows an example in which when each data memory block 1201, 1202, ..., has four subblocks, each entry 1101, 1102, ..., forming the free list memory 1100 has 4-bit bit masks. The number of subblocks forming a block 1201, 1202, ..., of the data memory 1200 can be any natural number, but in order to effectively use the present invention to store a variable size packet, a number obtained by raising 2 to the power of a positive integer such as 2, 4, and 8 is useful.

In each entry 1101, 1102, ..., forming the free list memory 1100, a pointer (NEXT_FREE_LIST_PTR) value indicating a next free memory space is basically used. By using this pointer, the free list memory 1100 maintains the free memory space of the data memory 1200 as a list, and if there is a request for allocation, begins allocation from the header of the list.

The registers 1300 keep a pointer (Header Pointer of Free List; HPFL) for the start location and a pointer (Tail Pointer of Free List; TPFL) for the last location of each list in order to respond to the request for allocation. For example, assuming that the number of subblocks in a block is X, the number of pointer pairs of the registers 1300 is "1+log$_2$X". That is, if the number of subblocks in a block is 4 as in FIG. 1, the registers 1300 have 3 pointer pairs (1+log$_2$4=3). Accordingly, the registers 1300 have 6 pointers represented as reference numbers 1301 through 1306. At this time, the first and second pointers 1301 and 1302 are used for allocation of memory space of an n-byte size in the data memory 1200. The third and fourth pointers 1303 and 1304 are used for allocation of memory space of an n/2-byte size and the fifth and sixth pointers 1305 and 1306 are used for allocation of memory space of an n/4-byte size in the data memory 1200.

For example, when the size of a block is 256 bytes (n=256) and if there is a request for allocating a memory space of 129 bytes to 256 bytes, an entry corresponding to the value of the first pointer (1HPFL) 1301 is allocated and the value of the first pointer 1301 is updated with a NEXT_FREE_LIST_PTR value. When the allocated 256-byte block is deallocated, the block is added to the free list memory 1100 through the second pointer (1TPFL) 1302. In the same manner, allocating memory space of 65 bytes to 128 bytes is performed through the third pointer (2HPFL) 1303, and deallocating the allocated 128-byte block is performed through the fourth pointer (2TPFL) 1304. Allocating memory space equal to or less than 64 bytes is performed through the fifth pointer (3HPFL) 1305 and deallocating the allocated 64-type block is performed through the sixth pointer (3TPFL) 1306.

At this time, whenever a corresponding data memory block is used, the bit mask indicates whether or not each subblock is allocated and currently used. Accordingly, when an allocated memory space is deallocated, even though 64 bytes are deallocated, if a contiguous subblock in the identical entry is not in use (that is, if a contiguous 128-byte memory space is not used), the subblock is not deallocated as a 64-byte space but is deallocated together with the neighboring 64-byte space as a 128-byte space such that the memory space of the data memory 1200 can be effectively used. For the deallocation operation at this time, instead of the sixth pointer 1306 managing the deallocation of 64 bytes, the fourth pointer 1304 managing deallocation of 128 bytes is used. This deallocation rule of memory space according to the present invention can be applied in the same manner to memory space deallocation between a 128-byte space and a 256-byte space, as well as a 64-byte space and a 128-byte space.

As described above, according to the memory management apparatus, the data memory 1200 allocates a block or a subblock of the most suitable size when there is a request for allocation of memory space, and when an allocated memory space is deallocated, deallocates memory space of a maximum size that can be allocated, depending on whether or not a contiguous subblock in the same entry is in use. Accordingly, the apparatus can effectively respond to a request for allocating a small-sized memory space and optimum utilization of memory space is enabled.

Figure 2:
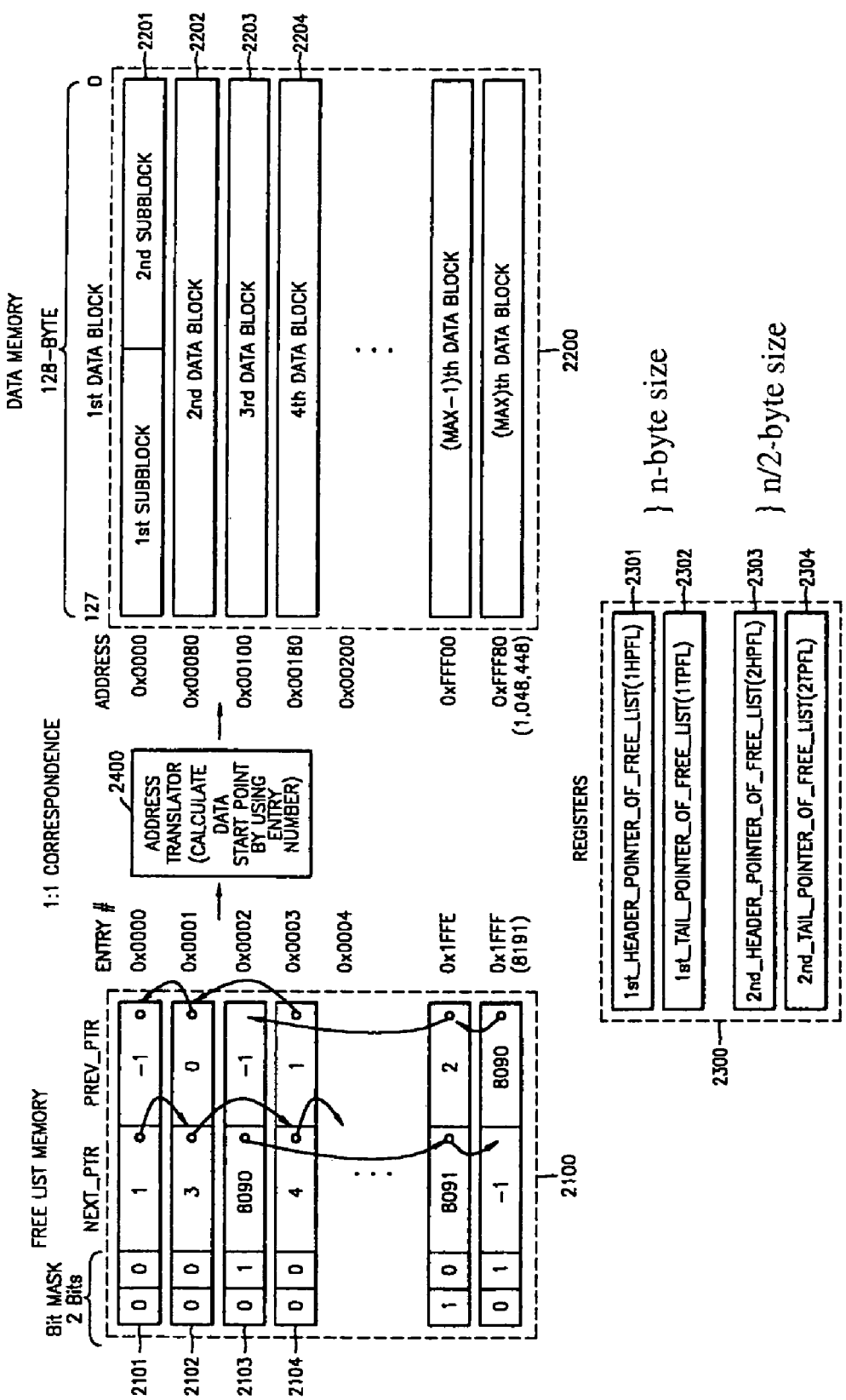
FIG. 2 is a block diagram showing an example of memory space allocation of a memory device according to a preferred embodiment of the present invention in which one data memory block comprises 2 subblocks.

FIG. 2 is a block diagram showing an example of memory space allocation of a memory device according to an embodiment of the present invention in which one data memory block comprises 2 subblocks.

Referring to FIG. 2, a data memory 2200 comprises blocks 2201, 2202, ..., each of which has 2 subblocks. Each entry 2101, 2102, ..., forming a free list memory 2100 corresponding to the data memory 2200, has 2-bit bit masks. In this case, since the number of subblocks of a block in the data memory 2200 is 2, the registers have 2 pointer pairs. Here, the first pointer (1HPFL) 2301 and the second pointer (1TPFL) 2302 stored in the registers 2300 are used for allocation and deallocation of memory space of 128 bytes and the third pointer (2HPFL) 2303 and the fourth pointer (2TPFL) 2304 are used for allocation and deallocation of memory space of 64 bytes.

FIG. 2 shows an example of the structure of the free list memory 2100 when the data memory 2200 is actually used. Referring to FIG. 2, when the bit mask value of the free list memory 2100 is "00", memory space corresponding to bit mask value "00" (that is, a memory space corresponding to entry number 0x0000, 0x0001, or 0x0003) can be allocated as a 128-byte memory space and therefore the free list memory 2100 can form a linked list for a 128-byte memory space as shown in FIG. 2. In this case, the first pointer 2301 has a value 0 corresponding to the head of the list (that is, entry number 0x0000).

When one of the 2-bit bit masks is 1 and the other bit is 0 (that is, when the bit masks are "10" or "01"), memory space corresponding to the entry (that is, a memory space corresponding to entry number 0x0002, 0x1FFE, or 0x1FFF) can be allocated as a 64-byte memory space and therefore the free list memory 2100 can form a linked list for a 64-byte memory space as shown in FIG. 2. In this case, the third pointer 2303 has a value 2 corresponding to the head of the list (that is, entry number 0x0002), and the fourth pointer 2304 has a value 8091 corresponding to the last value of the list (that is, entry number 0x1FFF). At this time, the previous pointer value (PREV_PTR) of the free list memory 2100 is not necessarily needed, but when there is a previous pointer value (PREV_PTR), there is an advantage in that when the entry is deleted in the list, the entry can be deleted and the list can be reconstructed at the speed of O(1). Here, O(n) is a method to express an execution speed in computer algorithms and indicates an operation speed in proportion to the number n. In addition, O(n$^2$) indicates a speed in proportion to n squared and O(1) indicates that a time having a predetermined constant value is taken irrespective of the number of entries. For example, when there is no previous pointer value (PREV_PTR) and an entry is to be deleted from a list, O(n) is taken because the list should be reconstructed after searching the list from the start for the entry location (here, n is the number of entries in the list linked by pointers). Compared to this case, when there is a previous pointer value (PREV_PTR) and an entry is to be deleted, the effort to search the list for the entry location is not needed such that the list can be directly reconstructed and O(1) is enabled.

FIG. 3 is a flowchart of the steps performed by a memory space allocation method for the memory device shown in FIG. 2.

Referring to FIG. 3, in order to allocate memory space, it is first determined whether or not the size of a requested memory space to be allocated is equal to or less than 64 bytes in step 3001. If the result of the determination in step 3001 indicates that the size of the requested memory space is equal to or less than 64 bytes, it is determined whether or not the entry of the data memory 2200 corresponding to the third pointer (2HPFL) 2303 of the registers 2300 is valid (that is, whether or not there is an free memory space in a 64-byte list managed by the free list memory 2100) in step 3002.

If the result of the determination in step 3002 indicates that the entry of the data memory 2200 corresponding to the third pointer (2HPFL) of the registers 2300 is valid, the 64-byte entry corresponding to the third pointer (2HPFL) is allocated as memory space and the bit mask of the corresponding subblock forming the entry is set to 1 in step 3203. Then, the third pointer (2HPFL) is updated with a NEXT_PTR value of the corresponding entry such that the 64-byte memory is allocated in step 3204.

If the result of the determination in step 3002 indicates that the entry of the data memory 2200 corresponding to the third pointer (2HPFL) is not valid, that is, if there is no free memory space in the 64-byte list managed by the free list memory 2100, the 128-byte entry corresponding to the first pointer (1HPFL) is allocated as memory space and the bit mask of the corresponding subblock forming the entry is set to 1 in step 3003. Then, by adding the allocated entry to the fourth pointer (2TPFL) used for managing a 64-byte list, the entry is added to the 64-byte list in step 3004. Next, by updating the first pointer (1HPFL) with the NEXT_PTR value of the corresponding entry, the entry is deleted from the 128-byte list in step 3005. As a result, half of the 128 bytes are allocated as memory space and the remaining half can be used for next 64-byte allocation.

If the result of the determination in step 3001 indicates that the size of the requested memory space is greater than 64 bytes, the 128-byte entry corresponding to the first pointer (that is, 1HPFL) 2301 of the registers 2300 is allocated and the bit mask corresponding to the entry is set to 1 in step 3102. Then, by updating the NEXT_PTR value of the corresponding entry with the first pointer (1HPFL), a 128-byte memory space is allocated in step 3103.

As described above, in the memory space allocation method according to the present invention, a predetermined memory space having a different size is allocated depending on the size of a requested memory space. For example, if the size of the requested memory space to be allocated is greater than 64 bytes, a 128-byte memory space is allocated, and if the size is equal to or less than 64 bytes, a 64-byte memory space is allocated. At this time, the block size of memory space to be allocated may be further divided by a user. Particularly in the memory space allocation method according to the present invention, when memory space equal to or less than 64 bytes is allocated, and if there is no valid entry in the 64-byte list, an entry in the 128-byte list is divided and then allocated as a 64-byte memory space. Accordingly, the memory allocation method according to the present invention can perform memory space allocation for both 64-byte and 128-byte memory spaces, basically using only the same amount of information as needed in managing 128-byte memory spaces.

FIG. 4 is a flowchart of the steps performed by a memory space deallocating method for the memory device shown in FIG. 2, and shows a process for deallocating memory spaces when a block of the data memory 2200 has 2 subblocks.

Referring to FIG. 4, for deallocation of memory spaces, it is first determined whether or not a deallocated memory space is equal to or less than 64 bytes in step 4001. If the result of the determination in step 4001 indicates that the size of the deallocated memory space is equal to or less than 64 bytes, it is determined whether or not the bit masks of the entry of the deallocated memory space are all set to 1 (that is, the corresponding entry can be deallocated so that it can be used as a 128-byte memory space) in step 4002.

If the result of the determination in step 4002 indicates that the bit masks of the deallocated entry are all set to 1 (that is, the corresponding entry is deallocated as a 64-byte memory space), the bit masks corresponding to the deallocated entry are set to 0 and a NEXT_PTR value is set to −1 in step 4203. Then, by setting the deallocated entry as the NEXT_PTR value of the entry corresponding to the fourth pointer (2TPFL) 2304, the entry is added to a 64-byte list in step 4204.

If the result of the determination in step 4002 indicates that the bit masks of the deallocated entry are not all set to 1 (that is, the corresponding entry can be deallocated as a 128-byte memory space), the deallocated entry is deleted from a 64-byte list in step 4003. Then, the bit masks corresponding to the deallocated entry are set to 0 and the NEXT_PTR value is set to −1 in step 4004. Next, by setting the deallocated entry as the NEXT_PTR value of the entry corresponding to the second pointer (1TPFL) 2302, the entry is added to a 128-byte list in step 4005.

If the result of the determination in step 4001 indicates that the size of a deallocated memory space is greater than 64 bytes, the bit masks corresponding to the deallocated entry are set to 0, and the NEXT_PTR value is set to −1 in step 4102. Then, by setting the deallocated entry as the NEXT_

PTR value of the entry corresponding to the second pointer (1TPFL) 2302, the entry is added to a 128-byte list in step 4103.

As described above, in the memory space deallocation method according to the present invention, predetermined memory spaces having different sizes are deallocated depending on the size of a deallocated memory space. For example, if the size of a requested memory space to be deallocated is greater than 64 bytes, memory space of 128 bytes is deallocated and if the size of a request memory space is equal to or less than 64 bytes, memory space of 64 bytes is deallocated. In the present invention, particularly when memory space equal to or less than 64 bytes is deallocated, if memory space of 64 bytes neighboring the deallocated 64 bytes in the same entry is not in use (that is, if the memory space is free), one 128-byte memory space is deallocated and then used, instead of deallocating the deallocated memory space and the neighboring memory space, as two 64-bytes memory spaces. Accordingly, in the memory space allocation method according to the present invention, a memory space is deallocated always as a maximum size that can be allocated, such that optimum utilization of memory space is enabled.

This memory space allocation and deallocation method provides a structure appropriate to storing Internet Protocol (IP) packets accounting for most of the data transmission on the Internet within the current network equipment. Theoretically, the size of an IP packet (i.e., the size of the header of an IP packet) can be 20 bytes to 64 Kbytes. However, average 300-byte packets are mainly used and 40-byte packets are mainly distributed in actual situations.

Accordingly, in most network equipment at present, a packet is divided into fixed segment units of 128 bytes or 256 bytes and then stored. Therefore, the last segment of a packet is mostly wasted, and when the characteristic of an IP packet that mainly uses 40 bytes is considered, if a packet is divided into segment units of 256 bytes or 128 bytes, more than half of the memory space is wasted.

Therefore, if the present invention is applied to network equipment, as shown in FIG. 2, memory space allocation of a 64-byte unit is enabled only with segment management information for 128 bytes, such that the wasting of memory space occurring in a 40-byte packet can be greatly reduced. Particularly, since the present invention can be implemented by hardware as a logic circuit for network equipment that should store packets at a high speed, it is suitable for high-speed memory space allocation and at the same time can utilize memory space effectively.

Though memory space allocation and deallocation for an IP packet in network equipment is specifically shown above as embodiments of the present invention, the present invention can also be applied to allocation and deallocation of memory spaces having different sizes that can be performed in a variety of devices utilizing storage devices (that is, memory devices).

The present invention may be embodied in a code, which can be read by a computer, on a computer readable recording medium. The computer readable recording medium includes all kinds of recording apparatuses on which computer readable data are stored. The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be distributed on computer systems connected through a network and can store and execute a computer readable code in a distributed mode.

According to the memory management apparatus and method for storing various sized packets, memory is divided into units of a plurality of fixed sizes and managed so that the addresses for allocated memory locations can be managed by hardware. Therefore, when memory space for a variable size packet less than a predetermined size is allocated, a block or subblock, which is the most suitable for the request for allocation of memory space, is allocated, and when an allocated memory space is deallocated, memory space of a maximum size that can be allocated is deallocated depending on whether or not a contiguous subblock in the same entry is in use. Accordingly, a request for allocating a small-sized memory space can be effectively managed and optimum utilization of memory space is enabled such that wasting memory can be minimized.

What is claimed is:

1. A memory management apparatus comprising:
a data memory which comprises a plurality of data blocks, each of which comprises a plurality of sub data blocks having a predetermined size, and when there is a request for allocating memory space of a variable size, allocates memory space in units of any one of the sub data blocks and the data blocks;
a free list memory which manages a free memory space of the data memory as an entry of a plurality of entries; and
registers that store a plurality of head location information and a plurality of tail location information of the entry,
wherein a first head location information in the plurality of head location information and a second head location information are used for allocation of different byte sizes in the data memory, and the free list memory and the data memory have an equal number of entries and all of the entries of the free list memory and all of the entries of the data memory have a 1:1 corresponding relationship, wherein use of pointers between the entries of the data memory and the entries of the free list memory is unnecessary.

2. The apparatus of claim 1, further comprising:
an address translator which performs address translation between the data memory and the free list memory.

3. The apparatus of claim 1, wherein the start address of each entry forming the data memory is determined by adding entry number x data block size (n) to data memory start address value.

4. The apparatus of claim 1, wherein the data memory has a hierarchical structure, in which the data memory contains the plurality of data blocks each having memory space of n bytes when n is a power of 2 and i and j are positive integers (i<j), and each data block of the plurality of data blocks comprises a first plurality of sub data blocks each having a memory space of $$\frac{n}{2^i}$$

bytes and each sub data block of the first plurality of sub data blocks comprises a second plurality of sub data blocks each having a memory space of $$\frac{n}{2^j}$$

bytes.

5. The apparatus of claim 1, wherein each entry forming the free list memory compnses:

a plurality of bit masks each indicating whether or not a sub data block of the plurality of sub data blocks is in use; and a first pointer which indicates one entry of the plurality of entries located immediately after another entry of the plurality of entries currently selected in the free list memory.

6. The apparatus of claim 5, wherein each entry forming the free list memory further comprises a second pointer indicating an entry located immediately before an entry currently selected in the free list memory.

7. The apparatus of claim 6, wherein according to a bit mask value of one bit mask of the plurality of bit masks, the free list memory forms an n-byte entry list capable of allocating an n-byte memory space, an $$\frac{n}{2^i}$$

byte entry list capable of allocating an $$\frac{n}{2^i}$$

byte memory space, and an $$\frac{n}{2^j}$$

byte entry list capable of allocating an $$\frac{n}{2^j}$$

byte memory space, where i, j and n are each a positive integer, i<j, and n is a power of 2.

8. The apparatus of claim 1, wherein when the data block is formed with X sub data blocks, the registers contain (1+log$_2$X) pointer pairs for storing the head location information and the tail location information of the at least one entry, where X is a positive integer.

9. The apparatus of claim 7, wherein when memory space of $$\frac{n}{2^i}$$

bytes is allocated, if there is no valid entry in the $$\frac{n}{2^i}$$

byte entry list, the $$\frac{n}{2^{i-1}}$$

byte entry list is divided and allocated as the $$\frac{n}{2^i}$$

byte memory space.

10. The apparatus of claim 7, wherein when memory space of $$\frac{n}{2^j}$$

byte is allocated, if there is no valid entry in the $$\frac{n}{2^j}$$

byte entry list, the $$\frac{n}{2^i}$$

byte entry list is divided and allocated as the $$\frac{n}{2^j}$$

byte memory space.

11. The apparatus of claim 7, wherein when the $$\frac{n}{2^i}$$

byte memory space is deallocated, if an $$\frac{n}{2^i}$$

byte memory space next to the deallocated memory space in the same entry is not in use, the deallocated memory space and the memory space next to the $$\frac{n}{2^i}$$

byte memory space are combined and deallocated as an $$\frac{n}{2^{i-1}}$$

byte memory space.

12. The apparatus of claim 8, wherein when the $$\frac{n}{2^j}$$

byte memory space is deallocated, if an $$\frac{n}{2^j}$$

byte memory space next to the deallocated memory space in the same entry is not in use, the deallocated memory space and the memory space next to the $$\frac{n}{2^i}$$

byte memory space are combined and deallocated as an $$\frac{n}{2^i}$$

byte memory space.

13. A memory allocation method comprising:
in a data memory,
(a) when n is a power of 2 and i is a positive integer, if the size of a requested memory space for allocation is greater than $$\frac{n}{2^i}$$

bytes, allocating an $$\frac{n}{2^{i-1}}$$

byte memory space to a valid entry existing in an $$\frac{n}{2^{i-1}}$$

byte entry list managed by a free list memory;
(b) if the size of a requested memory space for allocation is equal to or less than $$\frac{n}{2^i},$$

allocating an $$\frac{n}{2^i}$$

byte memory space to a valid entry existing in an $$\frac{n}{2^i}$$

byte entry list managed by the free list memory, but if there is no valid entry in the $$\frac{n}{2^i}$$

byte entry list, dividing the $$\frac{n}{2^{i-1}}$$

byte entry list and allocating the divided $$\frac{n}{2^{i-1}}$$

byte entry list as an $$\frac{n}{2^i}$$

byte memory space, and
(c) storing a plurality of head location information and a plurality of tail location information, wherein a first head location information in the plurality of head location information and a second head location information are used for allocation of different byte sizes in the data memory, and the free list memory and the data memory have an equal number of entries and all of the entries of the free list memory and all of the entries of the data memory have a 1:1 corresponding relationship, wherein use of pointers between the entries of the data memory and the entries of the free list memory is unnecessary.

14. The method of claim 13, wherein step (a) comprises:
(a-1) allocating an entry corresponding to a head location of the $$\frac{n}{2^{i-1}}$$

byte entry list as the memory space, and setting a bit mask corresponding to the memory space to a first value which indicates that the entry is currently in use; and
(a-2) updating the head location value of the $$\frac{n}{2^{i-1}}$$

byte entry list with the location value of a next entry in the $$\frac{n}{2^i}$$

byte entry list.

15. The method of claim 1, wherein step (b) comprises:
(b-1) determining whether or not there is a valid entry in the $$\frac{n}{2^i}$$

entry list;
(b-2) if the result of the determination in step (b-1) indicates that there is a valid entry in the $$\frac{n}{2^i}$$

byte entry list, allocating an entry corresponding to a head location of the $$\frac{n}{2^i}$$

byte entry list as the memory space and setting a bit mask corresponding to the memory space to the first value;
(b-3) updating the head location value of the $$\frac{n}{2^i}$$

byte entry list with the location value of a next entry in the entry list to which the previous entry belongs;
(b-4) if the result of the determination in step (b-1) indicates that there is no valid entry in the $$\frac{n}{2^i}$$

byte entry list, allocating an entry corresponding to a head location of the $$\frac{n}{2^{i-1}}$$

byte entry list as the memory space and setting the bit mask corresponding to the memory space to the first value;

(b-5) adding the location value of the allocated entry at the tail location of the $\frac{n}{2^i}$ byte entry list; and (b-6) updating the head location value of the $\frac{n}{2^{i-1}}$ byte entry list with the location value of a next entry in the entry list to which the previous entry belongs.

16. A memory deallocation method comprising:

in a data memory, (a) when n is a power of 2 and i is a positive integer, if the size of a deallocated memory space will be greater than $\frac{n}{2^i}$ bytes, deallocating an $\frac{n}{2^{i-1}}$ byte memory space to a data memory and including an entry, corresponding to the memory space in an $\frac{n}{2^{i-1}}$ byte entry list managed by a free list memory;

(b) if the size of a deallocated memory space will be equal to or less than $\frac{n}{2^i}$ byte deallocating a memory space of $\frac{n}{2^i}$ byte to the data memory and including an entry corresponding to the memory space in an $\frac{n}{2^i}$ byte entry list managed by the free list memory, but if a memory space next to the memory space in the $\frac{n}{2^{i-1}}$ byte entry list managed by the entry which manages the deallocated memory space is not in use, including an entry, which corresponds to a memory space obtained by combining the deallocated memory space and the memory space next to the memory space in the $\frac{n}{2^{i-1}}$ byte entry list, in the $\frac{n}{2^{i-1}}$ byte entry list, and (c) storing a plurality of head location information and a plurality of tail location information, wherein a first head location information in the plurality of head location information and a second head location information are used for allocation of different byte sizes in the data memory, and the free list memory and the data memory have an equal number of entries and all of the entries of the free list memory and all of the entries of the data memory have a 1:1 corresponding relationship, wherein use of pointers between the entries of the data memory and the entries of the free list memory is unnecessary.

17. The method of claim 16, wherein step (a) comprises:

(a-1) setting the bit mask of a data block corresponding to the deallocated memory space, to a first value indicating that the entry is not currently in use, and setting the location value of a next memory space to be used, to a second value indicating that there is no valid entry; and (a-2) adding the deallocated memory space to a tail location of the $\frac{n}{2^{i-1}}$ byte entry list.

18. The method of claim 16, wherein step (b) comprises:

(b-1) determining whether or not $\frac{n}{2^i}$ byte sub data blocks included in an entry to which the deallocated memory space belongs are all in use;

(b-2) if the result of the determination in step (b-1) indicates that all of the sub data blocks are in use, setting the bit mask of the sub data block corresponding to the deallocated memory space to the first value, and setting the location value of a next memory space to be used to the second value;

(b-3) adding the deallocated memory space to a tail location of the $\frac{n}{2^i}$ byte entry list;

(b-4) if the result of the determination in step (b-1) indicates that not all of the sub data blocks are in use, deleting the entry corresponding to the deallocated memory space from the $\frac{n}{2^i}$ byte entry list;

(b-5) setting the bit mask of the data block containing the deallocated memory space to the first value and setting the location value of a next memory space to be used to the second value; and (b-6) adding the deallocated memory space to a tail location of the $\frac{n}{2^{i-1}}$ byte entry list.

* * * * *